US012594446B2

(12) United States Patent
Mahrt

(10) Patent No.: US 12,594,446 B2
(45) Date of Patent: Apr. 7, 2026

(54) COMPRESSED AIR FOAM SYSTEM WITH VORTEX MANIFOLD

(71) Applicant: David G. Mahrt, Redding, CA (US)

(72) Inventor: David G. Mahrt, Redding, CA (US)

( * ) Notice: Subject to any disclaimer, the term of this patent is extended or adjusted under 35 U.S.C. 154(b) by 840 days.

(21) Appl. No.: 17/678,487

(22) Filed: Feb. 23, 2022

(65) Prior Publication Data

US 2022/0176176 A1 Jun. 9, 2022

Related U.S. Application Data

(60) Continuation-in-part of application No. 16/441,981, filed on Jun. 14, 2019, now abandoned, which is a division of application No. 15/464,124, filed on Mar. 20, 2017, now abandoned.

(60) Provisional application No. 63/153,304, filed on Feb. 24, 2021, provisional application No. 62/311,166, filed on Mar. 21, 2016.

(51) Int. Cl.
*A62C 5/02* (2006.01)
*A62C 13/62* (2006.01)

(52) U.S. Cl.
CPC .............. *A62C 5/022* (2013.01); *A62C 13/62* (2013.01)

(58) Field of Classification Search
CPC ............ A62C 5/02; A62C 5/022; A62C 13/62
See application file for complete search history.

(56) References Cited

U.S. PATENT DOCUMENTS

| | | | | |
|---|---|---|---|---|
| 3,456,675 | A | 7/1969 | Frailey | |
| 4,193,514 | A | 3/1980 | Langstroth | |
| 5,054,688 | A | 10/1991 | Grindley | |
| 8,360,339 | B2 | 1/2013 | Henry | |
| 8,882,001 | B2 | 11/2014 | Henry | |
| 9,067,090 | B2 | 6/2015 | Henry | |
| 2003/0150624 | A1 | 8/2003 | Rummel | |
| 2010/0116512 | A1* | 5/2010 | Henry | A62C 13/66 169/14 |
| 2010/0314137 | A1 | 12/2010 | Jackson | |
| 2013/0037277 | A1 | 2/2013 | Henry | |
| 2013/0175306 | A1 | 7/2013 | Frailey | |

FOREIGN PATENT DOCUMENTS

| | | |
|---|---|---|
| CN | 101920085 A | 12/2010 |

* cited by examiner

*Primary Examiner* — Tuongminh N Pham
(74) *Attorney, Agent, or Firm* — David T. Millers

(57) ABSTRACT

A fire suppression system may include a tank and a manifold that may be inside or outside the tank. The tank, when charged, holds a liquid and a gas. The manifold has an inlet coupled to receive a liquid flow from the tank and inlets configured to receive gas flows. The gas flows may be from an upper portion of the liquid tank. An expansion chamber in the manifold receives the liquid flow and the gas flows, which create a liquid-gas vortex or circulation around the expansion chamber that produces foam.

15 Claims, 7 Drawing Sheets

COMPRESSED AIR FOAM SYSTEM WITH VORTEX MANIFOLD

CROSS-REFERENCE TO RELATED APPLICATIONS

This patent document is a continuation-in-part and claims benefit of U.S. patent application Ser. No. 16/441,981, filed Jun. 14, 2019, which claims the benefit of the earlier filing date of U.S. patent application Ser. No. 15/464,124, filed Mar. 20, 2017, which claims benefit of the earlier filing date of U.S. provisional Pat. App. No. 62/311,166, filed Mar. 21, 2016, which is hereby incorporated by reference in its entirety.

BACKGROUND

Conventional CAFSs (Compressed Air Foam Systems) for fire suppression generally create foam by mixing a liquid solution containing water and foam concentrate from an extinguisher tank with an air flow from either an air compressor or a high-pressure air cylinder, e.g., a flow from a cylinder pressurized to about 3200 psi to 6000 psi regulated down to a safe working pressure. The compressor or high-pressure air cylinder can be cumbersome, difficult to maintain, and adds to the cost of the fire suppression system.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

A CAFS (Compressed Air Foam System) may eliminate the need for a high-pressure air cylinder or other gas supply separate from a tank containing a foam solution by receiving gas, e.g., air, flow from an upper portion of a tank and receiving liquid, e.g., foam solution, from a lower portion of a tank. In different implementations, a manifold for a CAFS fire extinguisher may be within the tank, e.g., an in-tank manifold, or outside the tank, e.g., an external manifold. In either case, the CAFS fire extinguisher may thus avoid drawbacks of high-pressure cylinders, which add to the system costs and can be cumbersome and difficult to refill. Accordingly, a CAFS System with an in-tank manifold may be smaller, lighter, less expensive, and easier to use and maintain than a conventional CAFS System.

In accordance with a further aspect of the current disclosure, an in-tank or external manifold for a CAFS system may include an expansion chamber that receives and mixes liquid and gas flows to create foam. One or more gas inlets may be arraigned asymmetrically around the expansion chamber to create circulation or a central vortex within the expansion chamber. In one example, the gas flows entering the expansion chamber consist of an upstream gas flow and a downstream gas flow. The upstream gas flow has a flow component perpendicular to a primary direction of the liquid flow into expansion chamber, and the downstream gas flow has a flow component perpendicular to the primary liquid direction but opposite to the perpendicular flow component of the upstream gas flow. As a result, all gas flows entering the expansion chamber contribute to and are directed along the circulation or central vortex in the same rotational sense, e.g., clockwise or counterclockwise, around the expansion chamber. The circulation or central vortex together with turbulences around the central vortex provide efficient mixing and foam creation. An outlet from the expansion chamber, which produces fire-suppressing foam, may restrict outflow, for repeated circulation and mixing of gas and liquid and efficient foam creation in the central vortex. A vortex-creating manifold of this type may efficiently produce foam at low gas pressures, which may be a concern in a CAFS system that mixes liquid and air from the same tank.

Figure 1:
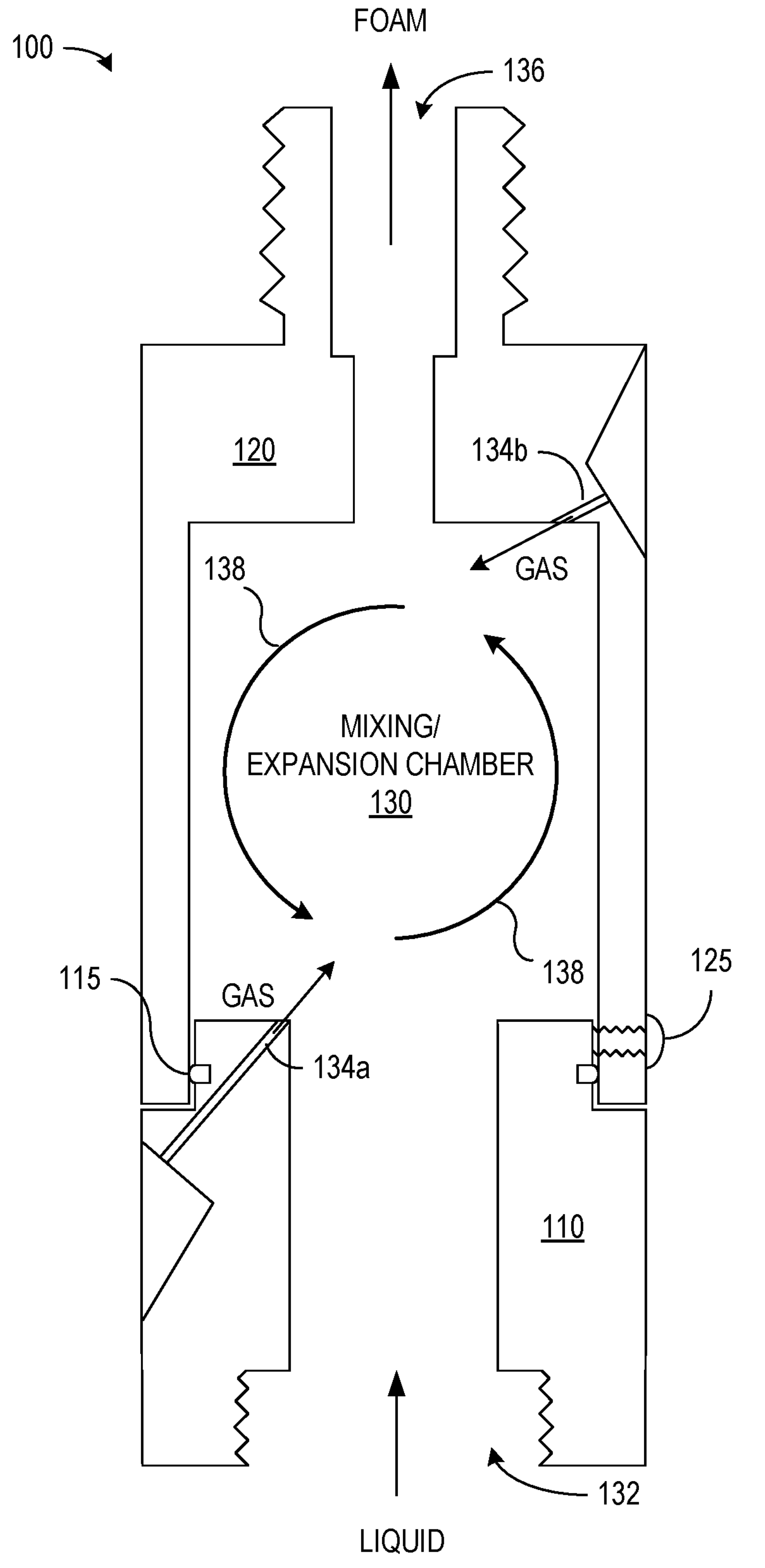
FIG. 1 shows an implementation of a two-piece manifold including an expansion chamber for generating fire suppressing foam.

FIG. 1 shows an in-tank manifold 100 for a CAFS system in accordance with one example of the current disclosure. Manifold 100 may be sized to fit inside the tank of a conventional fire extinguisher, and in one specific implementation may be about 4 to 5 inches long and about 1 to 1.25 inches in diameter, which allows insertion or removal of manifold 100 through the top opening in many conventional fire extinguisher tanks. In the illustrated configuration of FIG. 1, manifold 100 includes two major pieces 110 and 120, which may be made from any material of suitable strength and temperature tolerance. For example, manifold pieces 110 and 120 may be machined or otherwise made from a metal such as aluminum or stainless steel or from a high-strength plastic. Pieces 110 and 120 fit together to create or define an expansion chamber 130 for mixing of gas and solution to produce foam. FIG. 1 shows an implementation in which pieces 110 and 120 have mating portions that slip together, and one or more set screws 125 holds pieces 110 and 120 in place. An o-ring seal 115 between pieces 110 and 120 may prevent unwanted fluid flow into or leakage between manifold pieces 110 and 120. Alternatively, pieces 110 and 120 may be screwed together by threads or close fit and pressed together as described below, which may also prevent unwanted flow or leakage between manifold pieces 110 and 120 without need of an o-ring. The two-piece construction of manifold 100 has the advantage of permitting machining of manifold pieces 110 and 120 to provide expansion chamber 130 with a diameter larger than the diameters of the inlets and outlets of expansion chamber 130. Alternatively, casting or molding may be able to produce a one-piece construction for a manifold including an expansion chamber similar to expansion chamber 130.

Expansion chamber 130 is created when manifold piece 120 threads, slips, or is pressed onto manifold piece 110. Expansion chamber 130 may be cylindrical. Expansion chamber 130 as shown in FIG. 1 has one or more inlets 132 for liquid, one or more inlets 134_a_ and 134_b_ for gas, and one or more outlets 136 for foam. Liquid inlet 132 of manifold 100 is shaped to engage a dip tube, which may provide a feed of a water/concentrated foam mix. In the illustrated configuration, liquid inlet 132 is in bottom piece 110 of the manifold 100 and has threads, e.g., standard ½" pipe thread, into which a dip tube may be threaded. Expansion chamber 130 may have an interior diameter larger than an interior diameter of inlet 132, so that expansion or turbulence occurs when foam concentrate enters expansion chamber 130 through inlet 132. More particularly, expansion chamber 130 and inlet 132 may be sized to provide an interior pressure in expansion chamber 130 that is suitably less than the pressure of the solution entering through inlet 132 and the gas flows from inlets 134_a_ and 134_b_. For example, expansion chamber 130 may have an interior diameter of about 1 inch when inlet 132 has an interior diameter restricted to about ½ inch.

A bottom or upstream gas inlet 134_a_ into expansion chamber 130 may be at an angle, e.g., at 30° or more, with the fluid flow into expansion chamber 130, and a top or downstream gas inlet 134_b_ may be at an opposing angle, e.g., at 30° or more the fluid flow. The offsets and directions of inlets 134_a_ and 134_b_ and resulting gas flows relative to the flow direction through manifold 100 may vary but have opposing flow components that create a liquid-gas vortex 138 in expansion chamber 130, which may help mix liquid from inlet 132 and gas from inlets 134_a_ and 134_b_ to create foam. In the implementation of FIG. 1, bottom air inlet 134_a_ is in manifold piece 110 and top air inlet 134_b_ is in manifold piece 120, but other configurations are possible. With the configuration of gas inlets 134_a_ and 134_b_ shown in FIG. 1, top inlet 134_b_ may shoot a stream of air angled down into expansion chamber 130 and bottom inlet 134_a_ may shoot a stream of air angled up into expansion chamber 130, which may create vortex 138 that helps expand the foam chemical and water solution entering through liquid inlet 132 in manifold piece 110.

Foam created in expansion chamber 130 flows out of foam outlet 136, which in the illustrated configuration, is in manifold piece 120. A restriction or reduced diameter hole may be provided in outlet 136 to enhance a pressure differential between outlet 136 and expansion chamber 130, which may also increase or improve circulation of vortex 138, turbulence around vortex 138, expansion of liquid and gas entering expansion chamber 130, or mixing in chamber 130. For example, a restriction in outlet 136 may be about ⅜ inches in diameter when expansion chamber 130 is about 1 inch in diameter. Foam outlet 136 may thread into a release valve of a fire suppression system, e.g., into a standard squeeze handle of the 2.5-gallon stainless steel water fire extinguisher. Opening the release valve may start liquid and gas flow into expansion chamber 130 and release the foam from expansion chamber 130.

Figure 2:
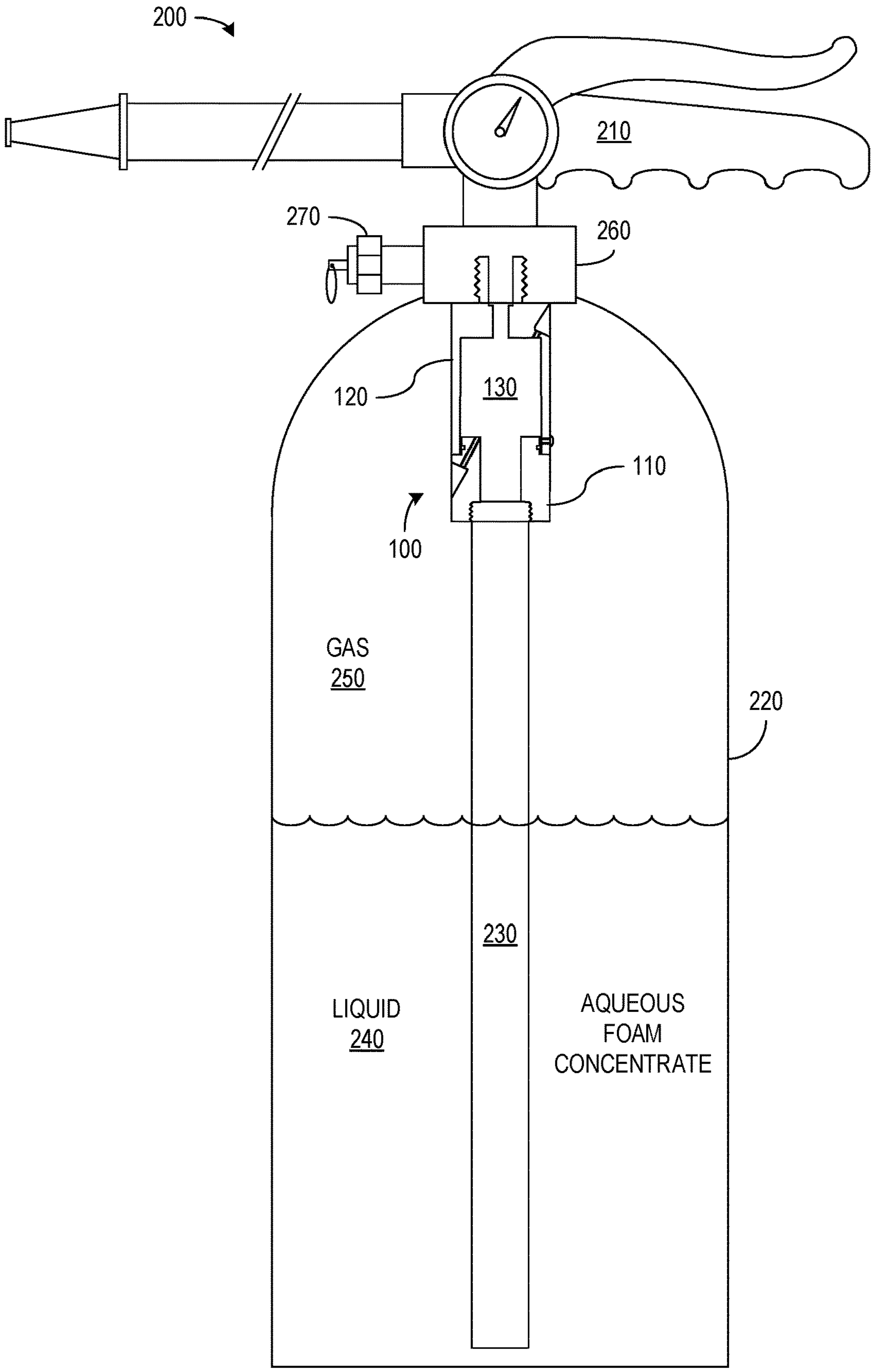
FIG. 2 shows an implementation of a fire suppression system having a manifold including an expansion chamber installed within a pressurized tank.

FIG. 2 illustrates a fire suppression system 200 in accordance with an implementation using in-tank manifold 100 of FIG. 1. In system 200, manifold 100 attaches to a squeeze handle 210. FIG. 2 shows a specific implementation in which manifold 100 is threaded into a fitting 260 for a pressure relief valve and fitting 260 attaches squeeze handle 210 to a tank 220. Alternatively, the foam outlet of manifold 100 may directly thread into squeeze handle 210. In either case, squeeze handle 210 with or without fitting 260 attaches to and seals tank 220 in a conventional manner for fire extinguishers so that tank 220 may be pressurized to a desired working pressure while manifold 100 is within tank 220. As shown in FIG. 2, tank 220 includes a single compartment that is partially filled with an aqueous foam concentrate 240, e.g., Class A foam concentrate, aqueous film forming foam (AFFF) concentrate, or polar solvent foam concentrate mixed with water, and is pressurized with a gas 250, e.g., air at about 100 to 300 psi or more. Tank 220 may, for example, be a 2.5-gallon stainless steel tank such as commonly employed for some fire extinguishers, but tank 220 may alternatively be of any size and construction capable of holding liquid and gas under suitable pressure.

Manifold 100 in the illustrated embodiment is near the top of tank 220 and in the gas-filled upper portion of tank 220, and a dip tube 230 threads into the liquid inlet of manifold 100 and extends into a liquid-filled lower portion of tank 220 and particularly down to near the bottom of a tank 220. In operation, a user depresses a portion of squeeze handle 210 opening a valve so that the higher pressure in tank 220 forces liquid 240 and gas 250 into expansion chamber 130 and toward the lower pressure outside tank 220. Liquid 240 particularly flows up dip tube 230 and into expansion chamber 130. Since manifold 100 and its gas inlets are above the level of liquid 240, gas 250 flows through the gas inlets of manifold 100 into mixing/expansion chamber 130. The mixing circulation and turbulence of liquid 240 and gas 250 in chamber 130 forms fire suppressant foam that exits through squeeze handle 210, and a nozzle that can direct the foam for fire suppression.

Tanks used in current pressurized fire extinguishers are commonly hydrotested up to 300 psi and are rated for working pressures of about 100 psi to 160 psi. Operating system 200 at a higher pressure up to 200 or 300 psi or more allows system 200 to be filled with a greater volume of liquid 240, while pressure of gas 250 maintains a strong stream of foam from system 200. System 200 may thus be able to provide more suppressant foam than do conventional CAFS extinguishers of the same volume.

Figure 3:
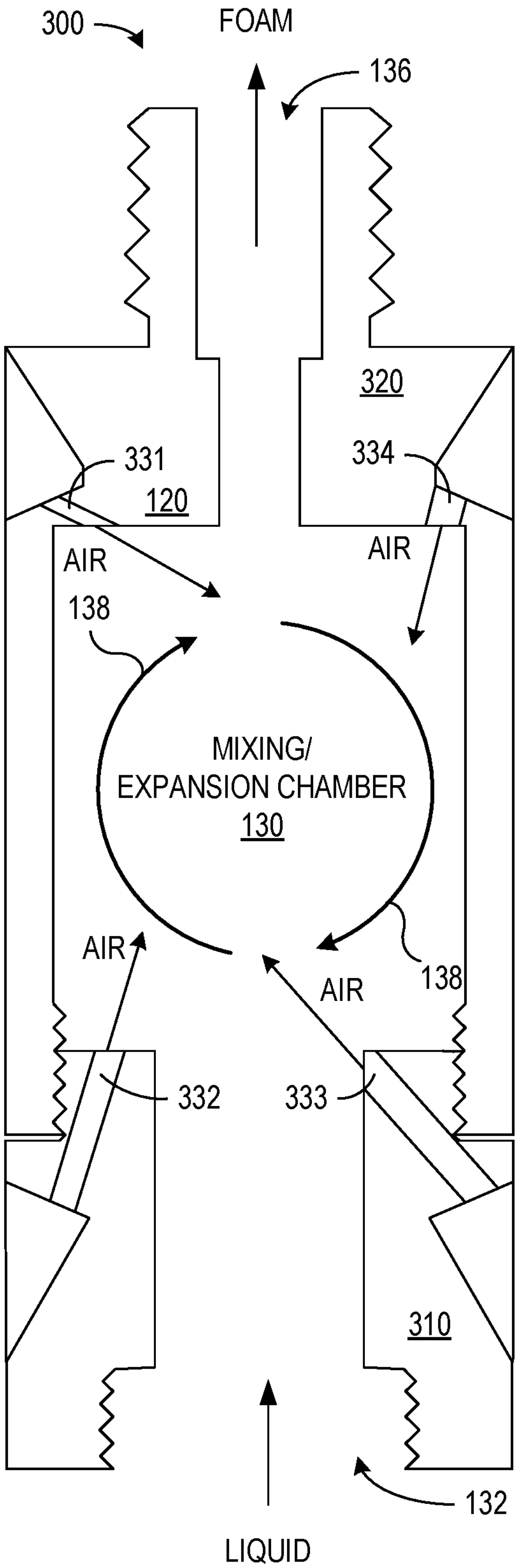
FIG. 3 shows a manifold in accordance with an implementation using air inlets of different sizes.

FIG. 3 shows an in-tank manifold 300 including a bottom piece 310 and a top piece 320 in accordance with another implementation. Manifold 300 may include many of the same features as described above for manifold 100. In particular, pieces 310 and 320 connect together to form an expansion chamber 130 having a liquid inlet 132 and a foam outlet 136, which may have the characteristics described above. FIG. 3 further illustrates how manifold 300 may include multiple gas inlets 331, 332, 333, and 334 providing gas flows in different directions and having fixed or drilled sizes, which may be different. For example, one inlet 331 may provide the smallest diameter or area gas inlet to expansion chamber 130, inlet 332 may be larger than inlet 331, inlet 333 may be larger than inlet 332, and inlet 334 may provide the largest diameter or area gas inlet to chamber 130. The locations, directions, and sizes of inlets 331, 332, 333, and 334 may be asymmetric and selected so that all inlets 331, 332, 333, and 334 contribute to the circulation or main vortex 138 in expansion chamber. In the illustrated example, upstream inlets 332 and 333 are at different angles relative to the liquid and foam flow direction into and out of expansion chamber 130 so that together inlets 332 and 333 contribute to circulation 138 in a clockwise direction. Similarly, downstream inlets 331 and 334 also have directions that contribute to circulation 138 in a clockwise direction.

FIG. 3 also illustrates how two manifold pieces 310 and 320 may be threaded together to create a chamber 130 that is larger than its inlets and outlets.

Figure 4:
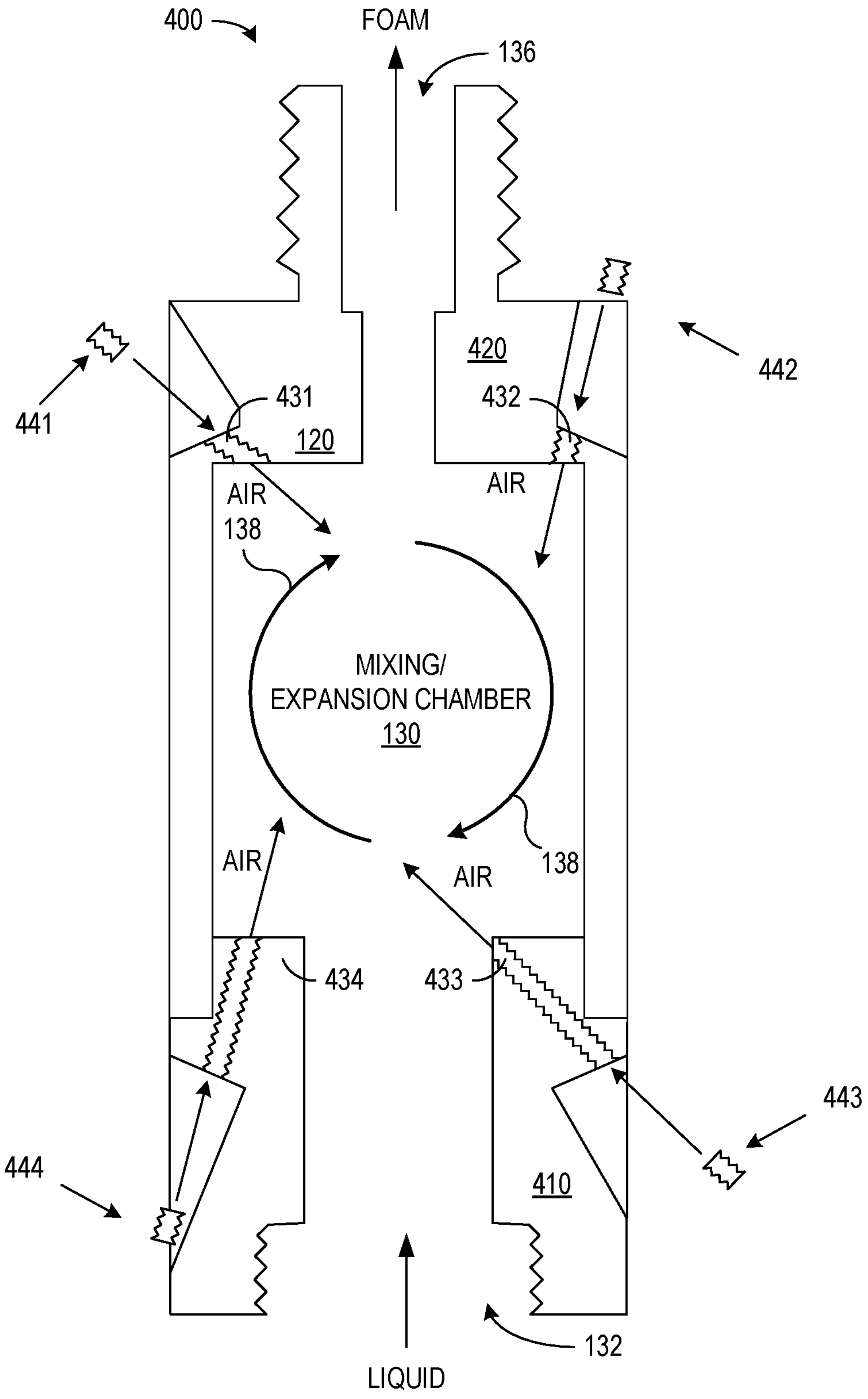
FIG. 4 shows a manifold in accordance with an implementation using inlets with replaceable jets.

FIG. 4 shows an in-tank manifold 400 that may include many of the same features as described above for manifold 100 or 300. In particular, pieces 410 and 420 of manifold 400 connect together to form an expansion chamber 130 having a liquid inlet 132 and a foam outlet 136, which may have the characteristics described above. Manifold 400 also includes a series of threaded gas inlets 431, 432, 433, and 434 in manifold pieces 410 and 420 and sized for installation of replaceable jets 441, 442, 443, and 444. For example, an Allen wrench can be used to install jets 441 to 444 in respective gas inlets 431 to 434 or remove the jets from the gas inlets. Each installed jet 441, 442, 443, or 444 has an orifice that limits the gas or air flow through the corresponding inlet 431, 432, 433, or 434. The orifices in jets 441, 442, 443, and 444 may all be the same size, or one or more of jets 441, 442, 443, and 444 may have different sizes. In some configurations, one or more of jets 441, 442, 443, and 444 may be omitted, and the diameters of inlets 431, 432, 433, and 444 without a jet defines a maximum orifice size. In one configuration, the orifices may be about 1/16 inch in diameter or smaller and inlets 431 to 424 may be about 1/4 inch in diameter. Depending on the orifice size or sizes in the installed jets 441, 442, 443, and 444, manifold 400 may produce a drier or wetter foam. In particular, jets with smaller orifices may be employed when a wetter foam is desired, or jets with larger orifices may be employed when a drier foam is desired.

Jets 441, 442, 443, and 444 installed in inlets 431, 432, 433, and 434 may be chosen to achieve the same effects as described above for manifold 300 of FIG. 3. For example, in the direction of circulation 138 in chamber 130, jet 441 may have the smallest diameter or area orifice, jet 442 may have a larger orifice than does jet 441, jet 443 may have a larger orifice than does jet 442, and jet 444 may have the largest diameter or area orifice. More generally, the sizes of the orifices may be selected to increase air flows that best direct the chosen direction, e.g., clockwise or counterclockwise, of mixing circulation 138 of liquid and gas in chamber 130.

FIG. 4 also illustrates how manifold pieces 410 and 420 may be tight fit and pressed together to create an expansion chamber 130 that is larger than inlets and outlets of expansion chamber 130. In particular, one piece 410 or 420 of manifold 400 may have a male mating portion with an outside diameter that is the same as or slightly larger than an inside diameter of a female mating portion of the other manifold piece 420 or 410. During manufacture of manifold 400, mating portions of manifold pieces 410 and 420 may be aligned, and a vise or press may apply pressure to force one mating portion into the other. If desired manifold 410 or 420 with the female mating portion may be heated. In any case, the tight fit may hold manifold pieces together without need of threads or a set screw.

Figure 5A:
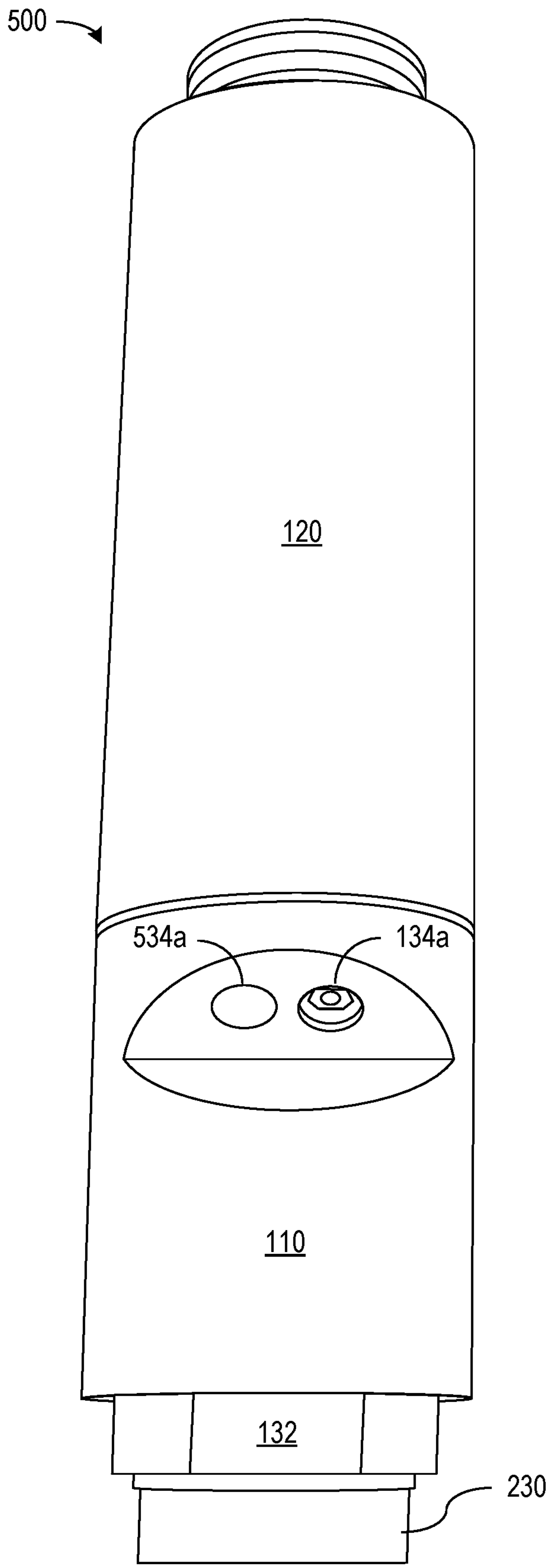
FIGS. 5A and 5B show perspective views of a manifold in accordance with an implementation having removable jets and storage pockets for the jets.
Figure 5B:
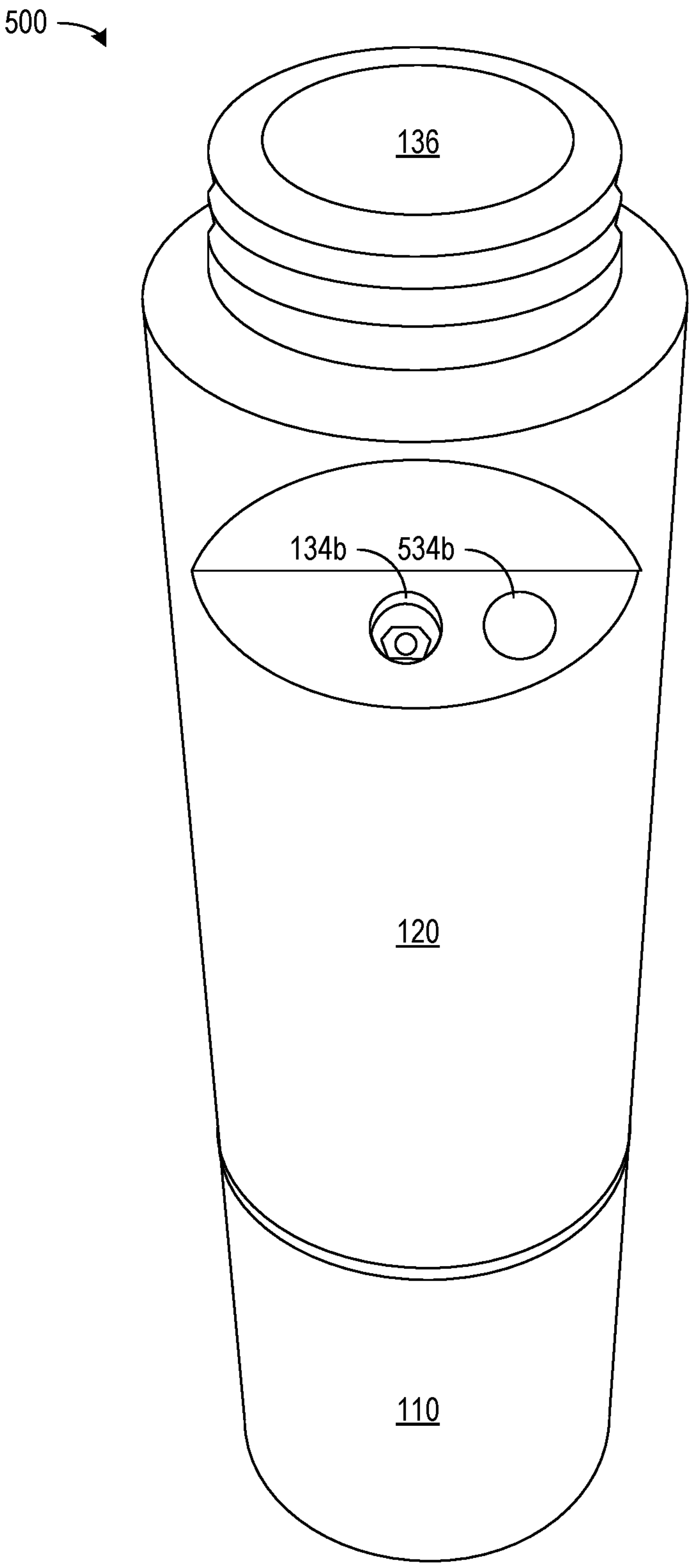

FIGS. 5A and 5B show exterior views of a manifold 500 that may have the same features as the manifolds described above. Manifold 500 includes two pieces 110 and 120 that engage each other to create a mixing or expansion chamber having a liquid inlet 132, one or more gas inlets 134*a* and 134*b*, and a foam outlet 136. Gas inlets 134*a* and 134*b* in manifold 500 extend through piece 110 or 120 to the expansion chamber and are threaded. Accordingly, jets may be screwed into either gas inlets 134*a* and 134*b* to control the size of the orifices through which gas flows into the expansion chamber. Manifold 500 further includes pockets 534*a* and 534*b* that may have the same threading as gas inlets 134*a* and 134*b* but do not extend through piece 110 or 120 to the expansion chamber. Accordingly, no gas flows through pocket 534*a* or 534*b*, but a jet may be screwed into either pocket 534*a* or 534*b* for storage when not in use. For example, manifold 500 may come with multiple jets with different size orifices for use in inlets 134*a* and 134*b*, and a user may select jets according to whether a drier or a wetter foam is desired. The user can then screw selected jets into gas inlets 134*a* and 134*b* and screw the spare jets into pockets 534*a* and 534*b*. Alternatively, manifold 500 may have a single jet for each gas inlet 134*a* or 134*b* and may give a user the option to use the jets in gas inlet 134*a* and 134*b* to restrict air flow into the mixing or expansion chamber or screw the unused jets into pocket 534*a* or 534*b* for unrestricted flow through gas inlets 134*a* or 134*b*.

Figure 6:
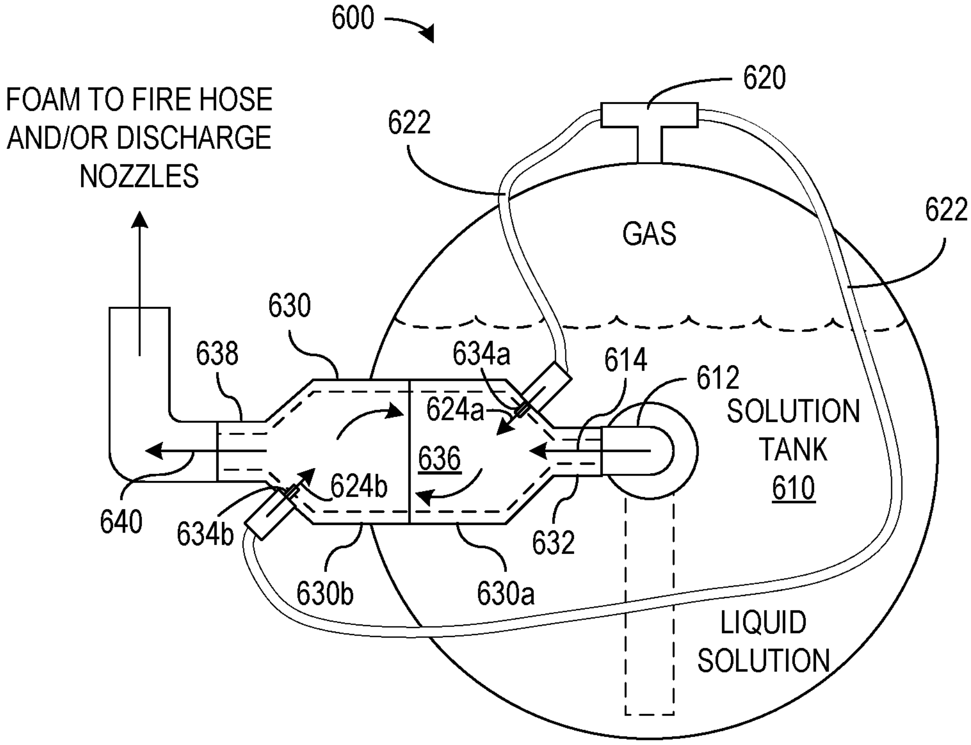
FIG. 6 shows an implementation of a fire suppression system using an external manifold using solution and gas flows from a solution tank to create a foam-forming vortex in an expansion chamber in the manifold.

FIG. 6 illustrates a fire suppression system 600 in accordance with an implementation using a solution tank 610, a liquid tap 612, a gas tap 620, and an external manifold 630. In system 600, manifold 630 is not inside solution tank 610. Instead, external manifold 630 is outside of solution tank 610 and has a liquid inlet 632 that receives a liquid solution from solution tank 610 and directs a liquid flow 614 into an expansion chamber 636 of manifold 630. Liquid inlet 632 of external manifold 630 may, for example, be threaded onto fitting of liquid tap or plumbing 612, which may be on the bottom of solution tank 610 or may extend into a lower portion of solution tank 610 to draw solution for near the bottom of solution tank 610. External manifold 630 also has gas inlets 634*a* and 634*b* that direct gas flows 624*a* and 624*b* into expansion chamber 636. Gas inlets 620 may receive gas from gas tap 620, which is positioned at or near the top of solution tank 610 to tap pressurized gas from the upper portion of solution tank 610. A pair of gas lines 622 attached to gas tap 620 may convey or provide gas flows 624*a* and 624*b* to manifold 630. External manifold 630 further has a foam outlet 638 that may conduct a form flow 640 from manifold 630 to a fire house and/or discharge nozzle of fire suppression system 600.

Solution tank 610 may be a conventional single compartment tank, e.g., a 5 to 200 gallon or larger tank, that is filled with liquid solution and gaseous air. The solution may particularly be an aqueous foam concentrate 240, e.g., Class A foam concentrate, aqueous film forming foam (AFFF) concentrate, or polar solvent foam concentrate mixed with water. Tank 610 may be pressurized with a gas, e.g., air at about 100 to 300 psi or more, and particularly may be connected to an air compressor (not shown) that maintains the pressure in tank 610 at a high enough pressure to push solution flow 614 into manifold and provide gas flow through tap 620. An advantage of manifold 630 receiving both gas and liquid from tank 610 is that the pressures of the liquid and gas fees are automatically regulated to be the same, and manifold 630 may be configured to receive liquid and gas at the same pressure. Tap 620, which receives gas, e.g., air, from a top portion of tank 610 as shown in FIG. 6, may include a tee, valves, or other conventional plumbing that feeds gas from tank 610 through lines 622 to provide gas flows 624*a* and 624*b* in external manifold 630.

Figure 7:
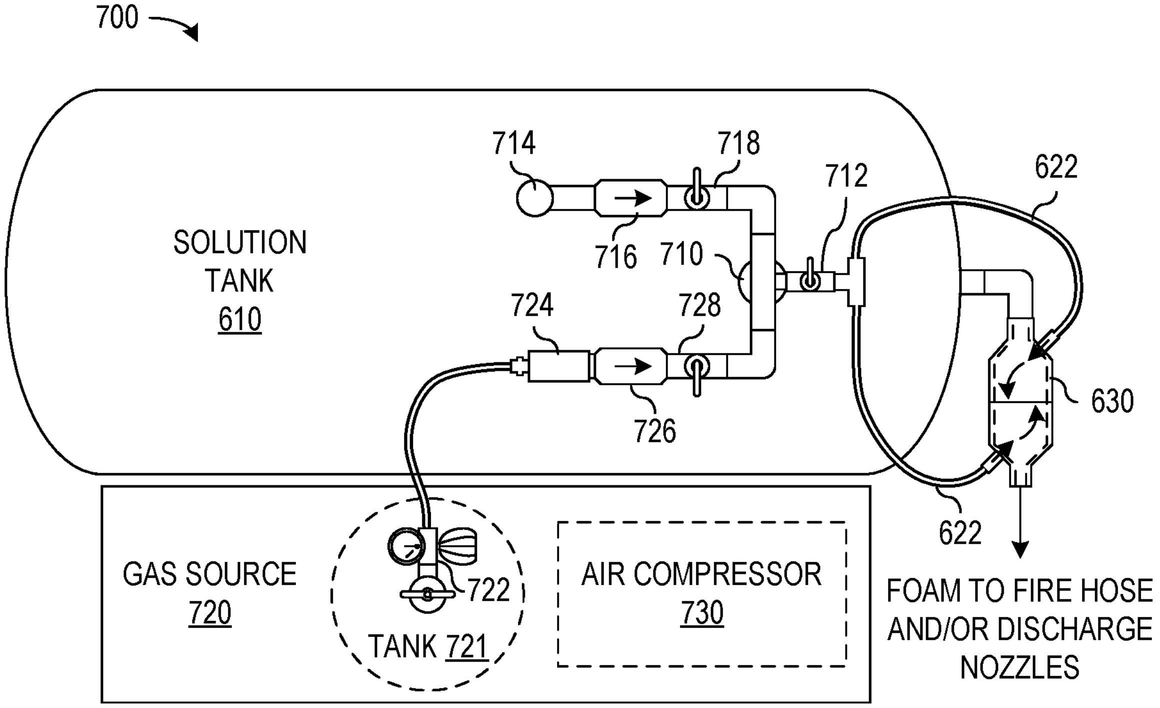
FIG. 7 shows an implementation of a fire suppression system using a solution tank and a separate gas source to provide liquid and gas flows to an external manifold that creates a foam-forming vortex in an expansion chamber in the manifold.

FIG. 7 shows a top view of a fire suppression system 700 having a separate gas source 720 connected to provide gas flows through lines 622 to gas inlets 634*a* and 634*b* of manifold 630. Gas source 720 also pressurize solution tank 610 and push liquid flow from solution tank 610 to manifold. With gas source 720, system 700 does not require that solution tank 610 always contains enough gas to supply air flows to manifold 630 for the entire fill of liquid solution in tack 610. Instead, solution tank 610 may initially be filled nearly to capacity with solution, and gas source 720 may gradually fill the top portion of tank 610 with gas as manifold 630 converts the solution to foam. Gas source 720 may be any suitable source capable of providing suitable gas flows to manifold 630. In the illustrated configuration, gas source 720 may be a high-pressure air or $CO_2$ tank with suitable regulators 722 to provide gas at desired pressure, e.g., 30 PSI to 300 PSI, for gas flows into manifold 630.

Alternatively, gas source 720 may include an air compressor that provides a continuous flow of gas at the desired pressure for an extended period.

FIG. 7 also shows a plumbing system that may be mounted on top of solution tank 610 for filling solution tank 610 with solution, pressuring solution tank 610, and providing gas flows to manifold 630. A liquid fill side of the plumbing system includes a fitting or fill tube or connector 714, a one-way or check valve 716, and an on-off valve 718 that connect to a top inlet/outlet or tap 710 of solution tank 610. When on-off valve 718 is open, liquid solution may be poured or pumped into connector 714, pass through check valve 716, on-off valve 718, and tap 710 of solution tank 610 into solution tank 610. Solution tank 610 may be depressurized and open to atmospheric pressure during filling, and the filling process may entirely or partially fill solution tank 610 with solution, while check valve 716 prevents back flow out of fill tube 714 and valves 712 and 728 prevent liquid escape though manifold 630 or a gas side of the plumbing system. The gas side of the plumbing system includes a quick connect fitting 724, a one-way or check valve 726, and on-off valve 728 through which gas may be delivered to solution tank 610 and a valve 712 through which gas may be delivered to lines 622 connected between the top tap 710 of solution tank 610 and manifold 630. The quick connect fitting 724 allows for easy replacement of gas source 720 to pressurize solution tank 610, e.g., when valves 712 and 718 are closed, or during operation when valve 712 is open and valve 718 is closed. Valve 712 controls gas flow from the top tap 710 in solution tank 610 to lines 622 and manifold 630.

One example process for using fire suppression system 700 may begin by fully filing solution tank 610 with solution and connecting as gas source 720 such as a high-pressure gas tank 721 with a regulator 722 to quick connect fitting 724. To create fire suppressing foam, high-pressure gas tank 721 supplies gas flow to pressurize solution tank 610 and thereby provides liquid and gas flows to manifold 630 so that manifold 630 creates fire suppression foam. If gas tank 721 runs low of gas, another gas tank 721 may be swapped by disconnecting the spent gas tank 721 from quick connect fitting 724 and connecting a fresh gas tank 720 to quick connect fitting 724. System 700 on one filling of solution tank 700 with solution may consume gas from one or multiple filled high-pressure tanks 721 to continue operating until the full tank of solution in solution tank 610 is exhausted.

Another example process of using system 700 may be employed if no filled pressure high-pressure tank 721 is available. For example, if a connected gas tank 721 runs low of gas and no fresh tank is available, the spent gas tank 721 may be disconnected from quick connect fitting 724, and fire suppression system 700 may be used no high-pressure tank 721. For use without a high-pressure tank 721, solution tank 700 may be partially filled with solution and pressurized with gas source 720, e.g., an air compressor 730, that is only temporarily connected to quick connect fitting 724. Once solution tank 610 is pressurized, gas source 720 may be disconnected from quick connect fitting 724, and system 700 may be moved and used to produce fire suppression foam using just the solution and air pressure from solution tank 610. Gas source 720 is thus not required for use of system 700 when solution tank 610 contains suitable amounts of pressurized gas and solution.

The alternative operating modes of system 700, i.e., with gas source 720 and without gas source 720, provide flexibility for in the field fire-suppression operations. For example, if solution tank has a 300-gallon capacity, a fire crew in the field may fill system 700 with a full 300 gallons of solution and connect a gas source 720 such as a high-pressure tank 721 that remains connected to solution tank 610 during operations. If the fire crew runs out of filled high-pressure tanks, the crew can still use of system 700 by partially filling solution tank 610 with solution, e.g., 150 gallons, and pressurizing solution tank 610 from an alternative gas source such as an air compressor, which may be connected through quick connect fitting 724 to pressurize tank 610. The gas source 720, in this case, may be only temporarily connected to fitting 724 to pressurize a solution tank 610 partially filled with solution, so that gas pressure from solution tank 610 can push gas and liquid flows to manifold 630 when no gas supply is connected to quick connect fitting 724. The gas source 720, therefore, does not need to be portable or transported with system 700 during operation. The gas source 720 may, for example, include an air compressor 730 at a fixed installation or on a truck or other equipment that does not need to accompany suppression system 700 in operation. Fire suppression system 700 thus has the flexibility to continue operating in a wide set of circumstances.

Manifold 630, as shown in FIG. 6 or 7, may include any manifold features described above, except that manifold 630 does not need to be located inside a solution tank and manifold 630 has gas inlets coupled to lines 622 providing gas to manifold 630. In the illustrated configuration, manifold 630 of FIG. 6 has a two-piece construction with pieces 630*a* and 630*b* attached, e.g., threaded or pressed together. Piece 630*a* includes liquid inlet 632 coupled to tank 610 to receive liquid flow 614, and piece 630*b* includes foam outlet 638 through which foam flow 640 may flow out of manifold 630, e.g., to one or more fire hoses, valves, and nozzles (not shown) that may distribute the foam to suppress fire. Manifold pieces 630*a* and 630*b* together enclose an expansion chamber 636 that receives and expands solution flow and gas flows 614, 624*a*, and 624*b* and creates a solution-gas vortex or circulation within expansion chamber 636.

Manifold 630 further includes inlets 634*a* and 634*b*, which may include jets that direct respective gas flows 624*a* and 624*b* into expansion chamber 636 inside manifold 630. Gas flows 624*a* and 624*b* are particularly controlled to create the desired circulation or vortex in the solution and air flowing through expansion chamber 636 or to otherwise efficiently mix gas flows 624*a* and 624*b* with solution flow 614 to create foam. To achieve the desired circulation or vortex mixing, gas flows 624*a* and 624*b* are separated from each other along the primary flow direction of solution/foam through manifold 630, each of the directions of gas flows 624*a* and 624*b* has at least a component perpendicular to the primary solution/foam flow direction or along the circulation direction. For example, the perpendicular flow component of gas flow 624*a* has a direction opposite to the direction of the perpendicular flow component of gas flow 624*b*, so that offset gas flows 624*a* and 624*b* tend to create a circulating or vortex flow within expansion chamber 636, which efficiently mixes gas and solution to create foam flow 640.

Foam 640 having desired characteristics, e.g., liquid-air ratio, may be achieved by adjusting the angles and sizes of gas inlets 634*a* and 634*b* and the sizes of liquid inlet 632 and foam outlet 638. Additionally, with fixed-sized inlets and outlets, pressure regulation of gas source 720, e.g., adjustment of a pump, air compressor, or the regulator 722 on a pressurized tank 721, may control the incoming liquid and gas flows and the outgoing flow of foam 640. Gas source 720, e.g., regulator 722 on high-pressure tank 721, may alter the flow rates of gas flows 634*a* and 634*b* to make foam 640 wetter or drier. As described above, inlets 634_a_ and 634_b_ may include jets that can be removed and replaced with jets of different sizes to optimize foam 640 for a particular user or application of foam 640.

Although implementations have been disclosed, these implementations are only examples and should not be taken as limitations. Various adaptations and combinations of features of the implementations disclosed are within the scope of the following claims.

What is claimed is:

1. A fire suppression system comprising:

a tank holding a liquid pressurized with a gas;

a manifold including:

an expansion chamber;

a liquid inlet coupled to a first portion of the tank containing the liquid, the liquid inlet directing a liquid flow of the liquid into the expansion chamber;

a foam outlet from the expansion chamber;

a first gas inlet connected to a second portion of the tank, the second portion containing the gas, the first gas inlet directing a first gas flow of the gas into the expansion chamber; and a second gas inlet connected to the second portion of the tank, the second gas inlet directing a second gas flow of the gas into the expansion chamber, the second gas inlet being downstream from the first gas inlet along a direction of the liquid flow, wherein the first inlet directs the first gas flow and the second gas inlet directs the second gas flow into the expansion chamber to create a central liquid-gas vortex that circulates in the expansion chamber in a rotational direction that is one of clockwise or counterclockwise, and wherein the manifold is external to the tank;

a tap through a shell of the tank and in fluid communication with the second portion of the tank;

a plumbing system connecting the tap to the first gas inlet and the second gas inlet; and a gas source connected to the plumbing system and providing the gas to pressurize the tank and for the first and second gas flows, wherein the plumbing system is switchable between a first mode in which the gas source is in fluid communication with the manifold and supplies the gas flowing to the manifold during a first fire suppression process and a second mode in which the fluid communication of the gas source with the manifold is disconnect and only the tank supplies the gas flowing to the manifold during a second fire suppression process.

2. The system of claim 1, wherein the manifold is a two-piece structure that comprises:

a first manifold piece; and a second manifold piece that attaches to first manifold piece, so that a cavity between the first and the second manifold pieces forms the expansion chamber.

3. The system of claim 2, wherein:

the liquid inlet and the first gas inlet extend through the first manifold piece to the expansion chamber; and the second gas inlet extends through the second manifold piece to the expansion chamber.

4. The system of claim 3, wherein the second manifold piece further comprises the foam outlet, the foam outlet directing a flow of the foam out of the expansion chamber.

5. The system of claim 2, wherein the first manifold piece attaches to the second manifold piece using structure selected from a group consisting of:

complementary threading that attaches the second manifold piece to the first manifold piece;

mating portions of the first and second manifold pieces that are pressed together; and a set screw that holds mating portions of the first and second manifold together.

6. The system of claim 1, wherein the system comprises a plurality of gas inlets, including the first gas inlet and the second gas inlet, in the manifold and directing gas flows into the expansion chamber.

7. The system of claim 6, wherein the gas inlets respectively have different sizes.

8. The system of claim 1, wherein the liquid comprises a water/concentrated foam mix.

9. The system of claim 1, wherein the liquid inlet has a diameter smaller than a diameter of the expansion chamber to thereby restrict the liquid flow so that expansion occurs where the liquid flow and the first and second gas flows enter the expansion chamber.

10. The system of claim 1, wherein the first gas inlet contains a removable jet having an orifice that limits the gas flow through the first gas inlet.

11. The system of claim 10, wherein the manifold further comprises a pocket sized to hold the removable jet when the removable jet is removed from the first gas inlet.

12. The system of claim 1, wherein the gas source is selected from a group consisting of an air compressor and a gas tank.

13. The system of claim 1, wherein:

the first gas inlet directs the first gas flow in a first direction having at least a first component perpendicular to the liquid flow; and the second gas inlet directs the second gas flow in a second direction having at least a second component perpendicular to the liquid flow, the second component being directed opposite of the first component, the first component and the second component being along the rotational direction of the central liquid-gas vortex in the expansion chamber.

14. The system of claim 1, wherein all gas flows entering the expansion chamber contribute to and are directed along the rotational direction of the central liquid-gas vortex in the expansion chamber.

15. The system of claim 1, wherein the plumbing system comprises a valve that is switchable between connecting the fluid communication of the gas source with the manifold during the first fire suppression process and disconnecting the fluid communication of the gas source with the manifold during the second fire suppression process.

* * * * *